April 8, 1969

F. J. CLEMENT 3,437,758

CONFERENCE TELEPHONE SYSTEM

Filed July 29, 1966

Sheet 1 of 4

INVENTOR
F. J. CLEMENT
BY E. J. Olinder
ATTORNEY

United States Patent Office 3,437,758
Patented Apr. 8, 1969

3,437,758
CONFERENCE TELEPHONE SYSTEM

Frank J. Clement, Matawan, N.J., assignor to Bell Telephone Laboratories, Inc., Murray Hill, Berkeley Heights, N.J., a corporation of New York
Filed July 29, 1966, Ser. No. 568,951
Int. Cl. H04m 3/08; H04b 3/20
U.S. Cl. 179—1 12 Claims

ABSTRACT OF THE DISCLOSURE

In a conference call circuit, the additive effects of noise are minimized by reducing the gain of all of the non-active microphone channels proportional to the number of active channels. Similarly, each microphone channel is gain-controlled by the incoming signal.

Figure 1A:
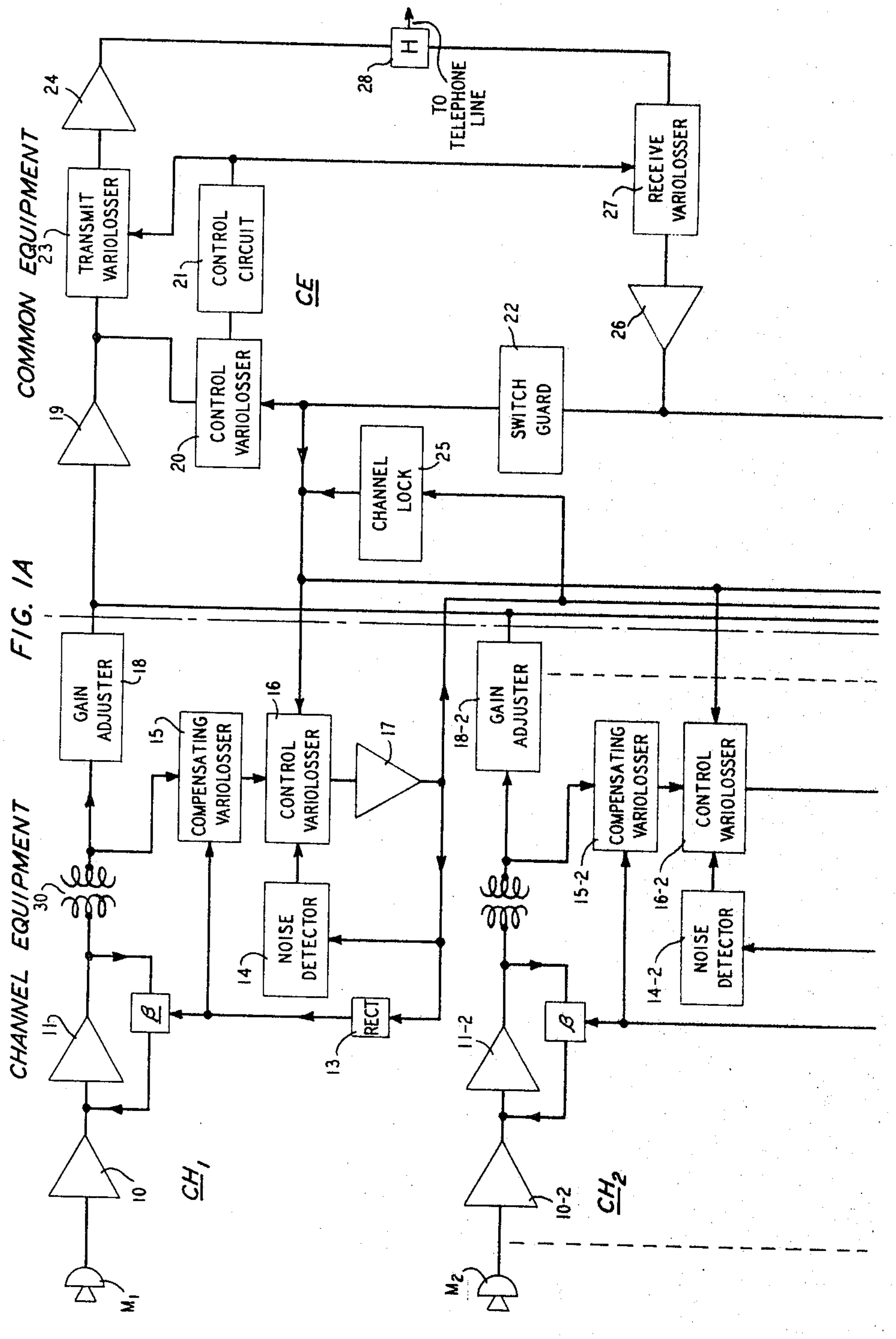

This invention relates to conference telephone systems of the type that employ separate transmitting and receiving circuits at each terminal to enable a group of people at one location to maintain two-way communications with a group or with a single party at a remote location.

In the art of hands-free telephony, also commonly termed the speakerphone art, it is well known that a separate microphone and loudspeaker may be employed in lieu of the conventional telephone handset in order to relieve the subscriber from the need of holding the handset equipment and further, to permit the subscriber complete freedom of movement within a reasonable distance from the transducers. In conventional speakerphone sets employing a single microphone, the annoying products of acoustic feedback and room noise transmission are substantially avoided by voice-switched circuits that control the direction of transmission. Such circuits are shown, for example, in Patent 3,171,901 issued to W. F. Clemency et al. on Mar. 2, 1965. As a result, transmission quality for single microphone speakerphones closely approaches the quality of conventional handset telephones.

Under very limited conditions a single speakerphone unit that includes only a single microphone and a single loudspeaker may also be used effectively for conference telephony. If speakerphone services are to be provided for a relatively large conference group, however, which may for example include a dozen or more people seated around a long table in a large room with less than ideal acoustics, a single speakerphone unit is obviosuly inadequate. For large conference groups a number of telephone microphones are desirable, preferably one for each conferee, as well as a number of loudspeakers. Unfortunately, the combination of a plurality of speakerphone units typically results in a marked impairment of transmission quality when compared to that attained by a single speakerphone. In multiple microphone conference telephone systems in the prior art the speech signal is generally transmitted by only one microphone at a time, although room noise is transmitted by all microphones. As a result, the signal-to-noise ratio of a multiple-microphone system is substantially less than that of a single microphone system. The signal-to-noise degradation is proportional to the manner in which the microphone outputs add together. This signal addition is complex and is dependent upon such variable factors as type of noise, room acoustics and microphone phasing. Conventional means for overcoming this deficiency have thus far been ineffective.

A related problem encountered with known conference telephone systems is the distracting effect of intermittent noise transmission which may be caused for example by paper shuffling and conversational asides. Noise transmission of the type indicated adds a reverberant characteristic that further reduces signal quality. As might be expected, room echoes add still another problem to a multiple microphone system, although this problem has been solved in part by the employment of echo suppressors at the expense, however, of an undesirable increase in circuit complexity. Moreover, prior art systems lack flexibility in that they are designed to accommodate a fixed number of channels without providing the means for the simple addition or removal of channels that is desirable to meet the changing needs of conference telephone applications.

The general object of the invention is to eliminate or at least to alleviate one or more of the problems outlined above.

This object and related objects are achieved in accordance with the principles of the invention by a voice-operated, microphone-selecting, gain-adjusting circuit, identified by the acronym vomsaga, that utilizes a relatively simple circuit combination on a per channel basis to provide a modified "voting" capability for each channel. A voting circuit permits only one microphone to be fully active at one time. In accordance with the invention, a low-loss transmission path is created for the channel with the strongest input signal while relatively high loss is maintained in the other channels. Moreover, the circuit can be adjusted to exclude completely any inactive channels. As a result, the adverse effects of both constant and intermittent noise are reduced.

In some environments it is desirable to allow more than one channel to be affected at the same time and, in accordance with the invention, adjusting means are provided to permit such an arrangement. Specifically, the adjusting means automatically reduces the gains of all active channels by an amount proportional to the number of active channels. In this fashion the output level of the circuit is made essentially equivalent to the level employed for single channel operation. In accordance with the invention the vomsaga circuit, irrespective of the number of active microphones, exhibits the output characteristics of a single microphone not only with respect to signal strength but also with respect to both signal-to-noise ratio and impedance. As a result, a vomsaga circuit is fully compatible with a conventional single telephone transmission line.

In accordance with one aspect of the invention a fixed amount of loss is inserted in each microphone channel during received speech. Thus, in effect, echo suppression is accomplished on a channel basis and the need for separate echo suppressor equipment is avoided.

Another aspect of the invention involves the employment of two variolosser circuits in each of the individual channel circuits. Although these variolossers are separate and distinct they are uniquely interconnected and commonly affected by one of two control currents in such a way that the resulting circuit may aptly be termed a compound variolosser. A feature of the compound variolosser in this particular environment is that it creates a type of hysteresis or delayed response effect in an active channel to the end that the possibility of false channel selection by impulse type room noise is markedly reduced.

Another feature of the invention that involves the utilization of a compound variolosser in each channel circuit is that of circuit simplicity. Interconnections between channels are minimized in that only two paths are required to provide intermicrophone channel control.

A key advantage of the vomsaga circuit over prior art systems is that it substantially increases the stability margin of a multimicrophone speakerphone system and thus permits an increase in gain in both the transmit and receive directions.

Figure 4:
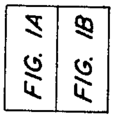
Figure 1B:
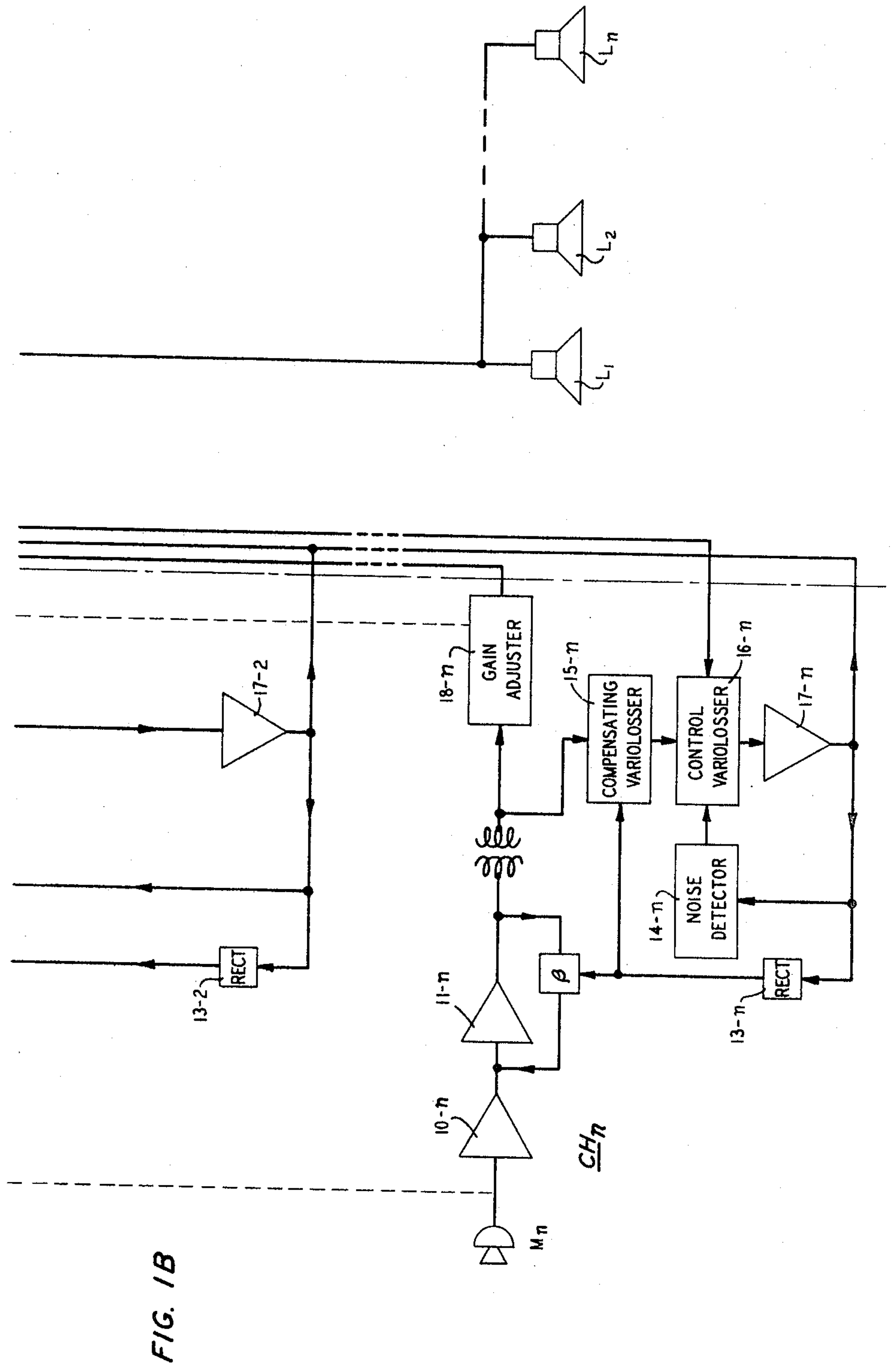
Figure 2:
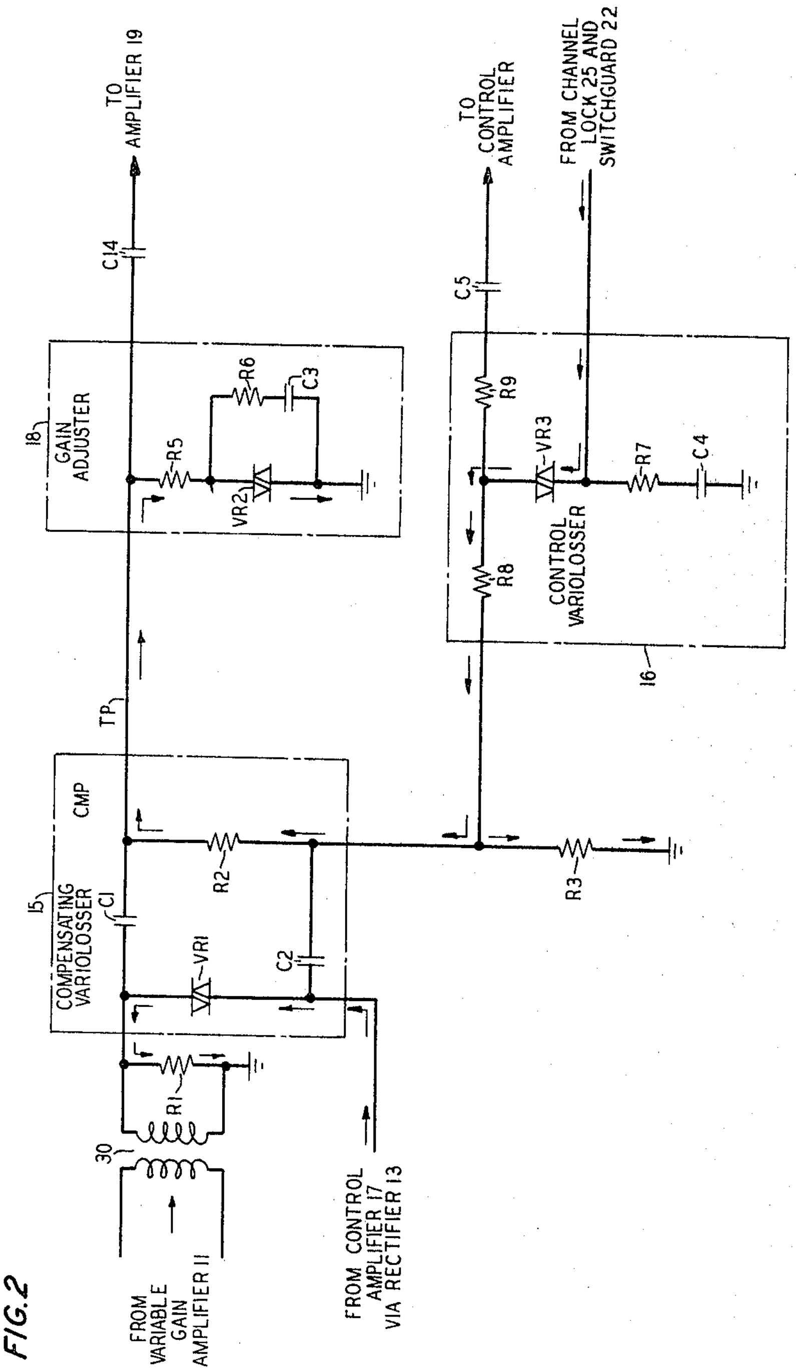
Figure 3:
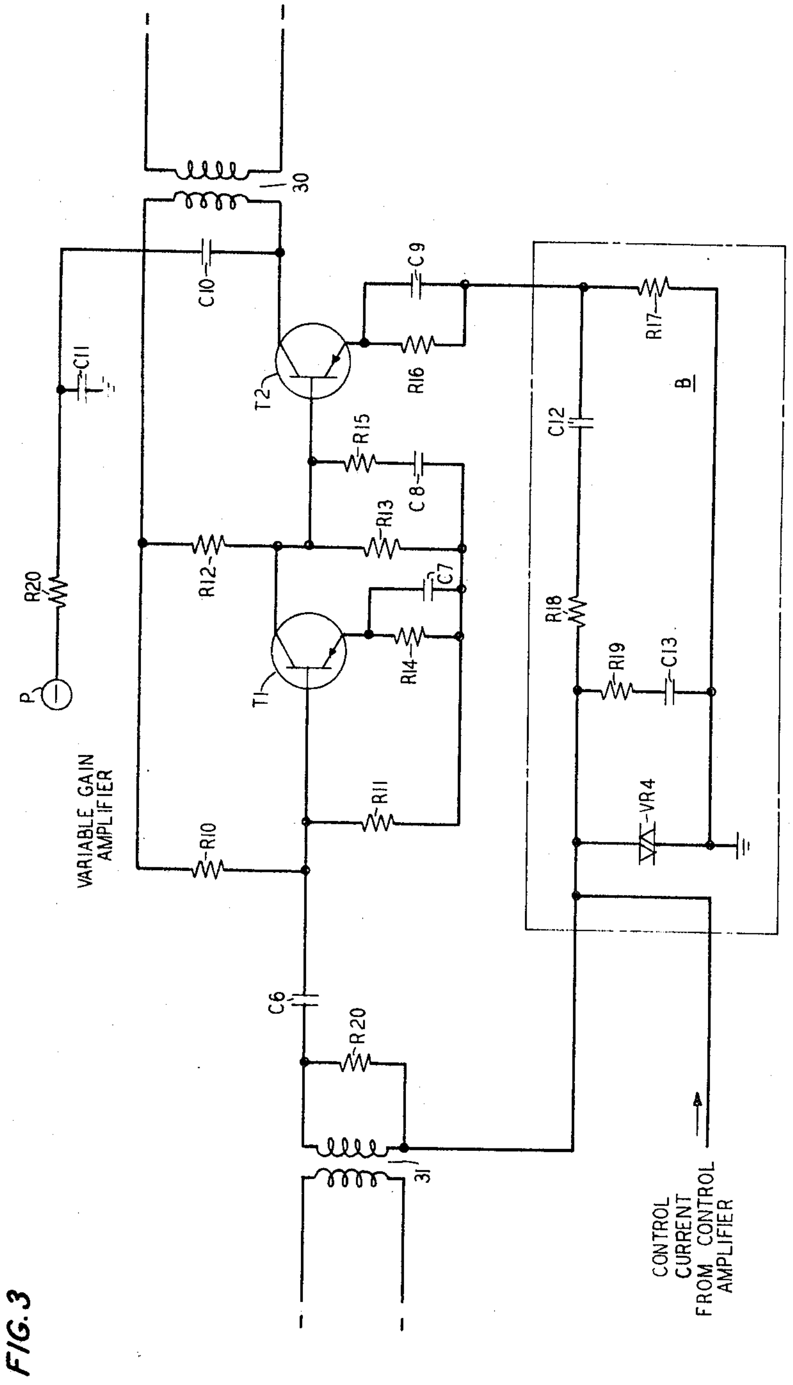

The principles of the invention together with additional specific objects and features thereof will be fully apprehended from the following detailed description of an illustrative embodiment and from the drawing in which:

FIGS 1A and 1B together present a block diagram of the vomsaga circuit in accordance with the invention;

FIGS. 2 and 3 are schematic circuit diagrams of indicated portions of the equipment shown in block form in FIGS. 1A and 1B; and FIG. 4 is a diagram of the relative positions of FIGS. 1A and 1B.

In the block diagram of FIGS. 1A and 1B the invention is shown embodied in a conference telephone system that includes a plurality of telephone microphones $M_1$, $M_2$ . . . $M_n$. Each of the microphones is connected to the common equipment CE, shown to the right of the dashed line, through a respective one of the individual channel circuits $CH_1$, $CH_2$ . . . $CH_n$. The individual channel circuits are identical and, accordingly, only one will be described herein.

The transmission path from microphone $M_1$ to the input of the common equipment CE includes a preamplifier 10, a variable gain amplifier 11, a transformer 30 and a gain adjuster circuit 18. The channel circuits $CH_1$, $CH_2$ . . . $CH_n$ are connected in parallel with the output of each applied to the input of amplifier 19, a unit of the common equipment CE. From the secondary side of transformer 30 a part of the output of the amplifier 11 is fed as a control signal to a compensating variolosser 15, thence to a control variolosser 16 and finally through a control amplifier 17. A part of the output of the control amplifier 17 is rectified by rectifier 13, and the resulting D-C control current is fed into the feedback circuit $\beta$ of the variable gain amplifier 11, increasing its gain. The remaining portion of the D-C output from the rectifier 13 is applied as control current to the compensating variolosser 15, reducing its loss.

As indicated, a portion of the output from the control amplifier 17 is applied to the input of a channel lock 25. The channel lock 25 is simply the combination of a power amplifier, a rectifier and a time constant circuit, such as an R-C circuit for example, that controls the attack and release times or the start and termination times of the output. Circuits of this type are well known in the art, being substantially identical to the control circuit of the speakerphone system shown in Patent 3,046,354, issued to W. F. Clemency June 24, 1962. The D-C output of the channel lock is applied to each control variolosser 16, 16–2 . . . **16–*n* increasing its loss, and through each gain adjuster 18, 18–2 . . . 18–*n*, which is connected in D-C series with the control variolosser 16** as shown in FIG. 2.

The gain adjuster 18 is a low range shunt variolosser, shown in detail in FIG. 2, which adjusts the output level from the channel circuit $CH_1$ before amplification by the amplifier 19. Essentially no loss is inserted by the gain adjuster 18 when only a single microphone channel is active. In accordance with the invention, however, if two or more of the microphones $M_1$, $M_2$ . . . $M_n$ are active at the same time, the increased control current from the channel lock 25 through the control variolosser 16 causes a small amount of loss, typically 3 to 6 db for each active microphone, to be inserted into each gain adjuster 18, 18–2 . . . **18–*n*. As additional microphones become active, the loss inserted into each of the gain adjustors 18, 18–2 . . . 18–*n*** increases in proportion to the number of microphones. In accordance with the invention, the ideal loss to be inserted in each channel for *n* active microphones is in the range of 10 log *n* to 20 log *n*, depending upon whether gain adjustment is effected on a voltage or on a power basis. The precise optimum level of loss within the range indicated is best determined for each individual system inasmuch as controlling variables such as room acoustics are unique to each environment.

The details of operation of a system in accordance with the invention as well as certain pertinent details of circuit configuration may best be described by tracing a signal from the microphone $M_1$ through to the hybrid circuit 28 and to the telephone line, not shown. Initially, let us assume that a voice signal is generated at microphone $M_1$ and that no other signals are present. The microphone output is amplified by the preamplifier 10 before it is applied to the variable gain amplifier 11 which is in a low gain state. A part of the output of the variable gain amplifier 11 is taken from the secondary of the transformer 30 and is applied through a control transmission path that includes the compensating variolosser 15, the control variolosser 16 and the control amplifier 17.

Simplified schematic circuit diagrams of the two variolossers 15 and 16 are shown in FIG. 2. The transmission path from the variable gain amplifier 11 to the amplifier 19 of the common equipment is indicated by the heavily drawn transmission path TP, FIG. 2. The D-C control current paths are represented by dotted lines. The current from the control amplifier 17 flows through varistor VR1 in compensating variolosser 15 which reduces the loss between the transmission path TP and the control variolosser 16. This effect stems from the well-known characteristic of varistors wherein the impedance is inversely proportional to the flow of D-C current. Alternatively, other devices having similar characteristics may be employed in lieu of varistors. Such devices include diodes, photo-diodes, saturated transistors and field effect transistors.

Capacitors C1 and C2 are blocking capacitors and resistor R2 controls the operating range of the varistor VR1. The combined output currents of the channel lock 25 and the switchguard circuit 22 flow through varistor VR3 of the control variolosser 16 which serves to increase the loss therein. The switchguard circuit 22 as well as the other equipment blocks of the common equipment CE, which includes the variolossers 20, 23 and 27, the amplifiers 24 and 26 and the hybrid circuit 28, are all well known in the speakerphone art, and accordingly are neither shown nor described in detail herein. An illustrative speakerphone system including such equipment is shown in Patent 3,171,901, cited above. Resistors R3, R7, R8 and R9 limit current flow and establish the operating range of the control variolosser. Capacitor C4 blocks D-C current flow to ground.

After passing through varistor VR3 and resistor R8, the control current divides as shown; a part is shunted to ground through resistor R3 and the remainder flows through varistor VR2 of the gain adjustor 18 by way of resistor R2 of variolosser 15 and resistor R5 of the gain adjustor circuit 18. Shunting resistor R6 and series resistor R5 control the operating range of the gain adjustor and capacitor C3 blocks the flow of D-C current through the shunt path. Resistor R5 also limits the maximum loss inserted by the gain adjustor 18.

As indicated above, when only one microphone is active, only a very small fraction of the total control current flows through the gain adjustor 18. This current has a negligible effect on the insertion loss of the gain adjustor 18 inasmuch as the impedance of varistor VR2 is very large compared to resistor R6 and thus the loss of the gain adjustor is controlled by the combination of the resistances of resistor R5 and resistor R6. When the control current increases from the inputs to additional microphones, however, the resistance of the varistor VR2 is reduced. Consequently, the loss in the transmission path TP is increased as an increasing proportion of the signal current is shunted to ground through the gain adjustor 18.

In accordance with the invention, the switched-loss characteristics of variolossers 15 and 16 are designed to be dependent upon each other. The amount of loss switched in any variolosser circuit is a function not only of the control current but also of the source and load impedance. Thus, if the resistance of resistor R8 is relatively small and the resistance of resistor R3 is relatively large, the load impedance of the compensating variolosser 15 is a function of the A-C impedance of varistor VR3, the control variolosser 16 varistor. Inasmuch as the impedance of a varistor varies inversely with D-C control current, the possible amount of loss removed by the compensating variolosser 15 is high when the current through the control variolosser 16 is high and is relatively low when little or no current flows. Conversely, the source impedance of the control variolosser 16 is a function of the A-C impedance of varistor VR1, the compensating variolosser 15 varistor. Specifically, the amount of loss inserted by the control variolosser 16 is high when no control current flows through the compensating variolosser 15 and is relatively low when there is little or no current present. Although the compensating variolosser 15 and the control variolosser 16 are shown as separate and distinct circuits, they may be more accurately described as parts of a single circuit with two control inputs and hence, in effect, form a compound variolosser.

The action of the control variolosser 16, as described above, establishes a type of hysteresis effect or delayed response in the active channel which, in accordance with the invention, reduces the possibility of false channel selection by impulse type room noise. Without such protection a high amplitude noise pulse picked up by an inactive channel, which might be caused by the accidental striking of a microphone for example, could cause the active channel to lose control momentarily with the result that a portion of the transmitted speech would be chopped out. A noise pulse generates additional channel lock current, however, which flows through each of the control variolossers 16, 16–2 . . . **16–*n*. This additional current can insert enough loss to lock out all inactive channels. The active channel remains essentially unaffected, however, owing to the switched condition of the compensating variolosser of this channel. The operation of the compound variolosser may also be viewed in terms of the "neutralizing" action of the compensating variolosser 15. In effect, the compensating variolosser neutralizes the loss inserted into the control variolosser 16 of the active channel. The output of the control amplifier 17, by means of the channel lock circuit 25, causes loss to be inserted at its own input. If this loss were not neutralized by the compensating variolosser 15**, the active channel would lose control.

An additional important feature of a compound variolosser utilized in accordance with the principles of the invention is that the interconnections between channels are reduced to a minimum in that only two interchannel paths are needed to provide the necessary control currents. Specifically, one path supplies the A-C control signal to the channel lock 25 and the other supplies the D-C control current to the variolossers. This arrangement provides the means for the simple addition or removal of microphone channels in accordance with the needs of the system.

After the voice signal from microphone $M_1$ has switched the common equipment in conventional speakerphone fashion to provide for full strength transmission through the hybrid 28 to the telephone line, it is desirable to hinder other microphone channels from also becoming active. This need is met in accordance with the invention by feeding a part of the A-C output of the control amplifier 17 to the channel lock 25. As described above, the D-C current output of the channel lock 25 flows through each of the control variolossers 16, 16–2 . . . **16–*n*. This current inserts loss into the control transmission paths, thereby making it more difficult for the other microphones to switch the loss out of their respective channels. It would at first appear that such control current would also adversely affect the transmission in the active channel. In accordance with the invention however, the compensating variolosser 15 nullifies loss in the active channel by virtue of the D-C current from the output of rectifier 13**, shown in FIG. 1, which flows through the circuit, reducing its loss.

One of the principles of the invention calls for a backward acting type of gain control in the variable gain amplifier 11. This arrangement also introduces a hysteresis-like characteristic or a delayed response into the channel switching. Thus, if a marginal signal has switched a microphone channel and the gain of the variable gain amplifier is increased by some margin such as 15 db for example, then a signal 15 db below the signal level is sufficient to hold the channel in the high gain state. This hysteresis effect plus a built-in hold-over time in the control amplifier 17 maintains an active channel in a low loss state during momentary pauses in speech. The magnitude of the hysteresis effect can be adjusted by changing the amount of loss switched by the control variolosser 15. A greater hysteresis effect can be obtained by overcompensating for the loss of the compensating variolosser 15, and a reduced effect can be obtained by undercompensating for such loss.

Microphone $M_2$, or any other microphone, can seize control from an active microphone such as microphone $M_1$ if the signal level into microphone $M_2$ is sufficient to overcome the loss in compensating variolosser 15–2 and generate an output from control amplifier 17–2. When channel control is seized in this manner, the D-C output from rectifier 13–2 increases the gain of the variable gain amplifier 11–2 and reduces the loss of the compensating variolosser 15–2, thus activating the channel $CH_2$. At the same time, a portion of the A-C output of control amplifier 17–2 is applied to the channel lock 25 increasing its D-C output. Consequently, the loss of *all* control variolossers is increased as described above, which may cause microphone $M_1$ to lose control and be switched out. If microphone $M_1$ does not lose control, however, both microphone channels $CH_1$ and $CH_2$ remain active. In that event, the increased current in the control variolosser 16, which current also flows through gain adjustor 18, now causes loss to be inserted into the gain adjustor 18 thereby reducing the gains of both active channels.

In accordance with the invention, two channels can be active for more than transient periods if a talker is located equidistant from two microphones. By reducing the gains of both microphone channels $CH_1$ and $CH_2$, the output of the vomsaga circuit is maintained at substantially the same level as that produced by a single active microphone.

When speech signals are received from the distant station, the switchguard circuit 22 operates to prevent outgoing transmission on a differential basis as described in the Clemency patents cited above. The D-C switchguard current is derived from the received speech and is applied to the control variolosser 20. The threshold at which transmit switching can occur is increased, thus making it more difficult for local speech to cause switching. Switchguard action also helps to prevent false switching which might otherwise result from acoustic coupling between one of the loudspeakers $L_1$, $L_2$ . . . $L_n$ and one of the microphones $M_1$, $M_2$ . . . $M_n$. Inasmuch as the D-C output of the switchguard 22 is combined with the D-C output of the channel lock 25, the switchguard current also flows through the gain adjustor circuits 18, 18–2 . . . **18–*n***. Thus, during received speech, loss is inserted into each microphone channel. This loss plus the low gain state of the variable gain amplifier provides full protection against retransmitting echoes.

As a consequence of the previously described hysteresis effect that is built into each of the channel circuits $CH_1$, $CH_2$ . . . $CH_n$, room noise could conceivably lock a channel into the transmit state after its loss has been switched out by another voice input unless special protection is provided. Such protection is afforded in accordance with the invention by a noise detector 14 shown in block form in FIG. 1A. This circuit is substantially identical to the nogad (noise operated gain adjusting device) circuit found in many speakerphone systems as shown and described in detail in Patent 1,814,018 issued to D. Mitchell and S. B. Wright on July 14, 1931. Another circuit of similar function is described in the May 1961 issue of the Bell System Technical Journal beginning at page 649 in an article by W. F. Clemency and W. D. Goodale. The noise detector 14 is virtually insensitive to voice frequency signals because of a slow build-up, quick-release characteristic. In response to noise signals, however, it applies a direct current control signal to the control variolosser 16, proportional to the noise signal alone, which increases the loss of the control variolosser 16 to a degree that is sufficient to release the channel.

The general function and operation of the variable gain amplifier 11 shown in block form in FIG. 1A has been described above. A detailed schematic circuit diagram of this unit is shown in FIG. 3. The amplifier utilizes two direct coupled transistors T1 and T2 with a series-series feedback arrangement that reduces distortion to a minimum level. Input signals from the output of the preamplifier 10 are applied to the base of transistor T1 by way of a transformer 31 and a coupling capacitor C6. A biasing current is applied from the power source P by way of resistors R20, R10 and R12. Conventional emitter resistors R14 and R16 are shunted by capacitors C7 and C9 respectively. A first feedback path is established by way of resistor R15, capacitor C8 and resistor R11. A second feedback path through the feedback circuit $\beta$ is completed from the emitter of transistor T2 through capacitor C9. The feedback circuit $\beta$ includes a varistor VR4 shunted by resistors R17 and R19 and by capacitor C13. When a D-C control current flows through varistor VR4 a part of the feedback current is shunted to ground and the gain of the amplifier is thereby increased. Amplifier output is applied to the transformer 30 from the collector of transistor T2.

It is to be understood that the embodiment described herein is merely illustrative of the principles of the invention. Various modifications may be effected by persons skilled in the art without departing from the spirit and scope of the invention.

What is claimed is:

1. A multitransmitter, multiloudspeaker conference telephone system comprising, in combination, means responsive to received speech signals for inserting a fixed amount of loss in each of the channels corresponding to said transmitters, thereby effecting echo suppression on a channel basis and eliminating the need for a separate echo suppressor circuit, means for permitting simultaneous activation of a plurality of said transmitters, and means responsive to speech signals from a plurality of said transmitters for automatically reducing the gains of all active ones of said channels by an amount proportional to the number of active channels, thereby ensuring a substantially constant total output level irrespective of the number of said channels being activated.

2. In a conference telephone system, in combination, a plurality of microphones, a common voice-switched network connectable to a telephone line, a plurality of individual voice-switched networks each connecting a respective one of said microphones to said common network, each of said individual networks including respective means responsive to first and second control currents for varying the transmission loss in said last named network, said first control current being proportional to the noise input to said last named network and said second control current being proportional to the combined outputs of all of said individual networks.

3. Apparatus in accordance with claim 2 wherein said second control current is proportional to the combined outputs of all of said networks and is further proportional to the receive input to said common network.

4. In a conference telephone system, in combination, a plurality of input transducers, a common voice-switched network for controlling the direction of transmission over a telephone line, a plurality of individual voice-switched networks each connecting a respective one of said transducers to said common network, each of said individual networks including a first amplifier having gain control means, means for applying a first control current to said gain control means including first and second variolossers and a control amplifier in series relation connected between the output of said first amplifier and said gain control means, means including a noise detector circuit for applying a second control current to said second variolosser and means for applying a third control current from said common network to said second variolosser.

5. In a conference telephone system station, in combination, a plurality of input transducers, a common voice-switched network for controlling the direction of transmission over a telephone line, a plurality of individual voice-switched networks each connecting a respective one of said transducers to said common network and means responsive to signals received from said telephone line for increasing the loss in each of said individual networks whereby protection is afforded against retransmitting echoes caused by acoustic coupling.

6. A communication system comprising, in combination, a plurality of input signal sources in parallel circuit configuration; a common network for controlling the direction of transmission in a transmission medium; a plurality of parallel conducting paths each connecting a respective one of said sources to said network; means responsive to a first signal from a first one of said sources exceeding a preselected level for reducing the transmission loss in a corresponding first one of said conducting paths whereby a first output signal is applied by way of said network to said medium; means responsive to said last named signal for increasing the loss in all of said conducting paths except said first path; means responsive to a second signal from a second one of said sources exceeding a preselected level during transmission from said first source for reducing the loss in a corresponding second one of said conducting paths whereby a second output signal is applied to said medium simultaneously with said first signal; and means responsive to the combination of said first and second signals for maintaining the magnitude of the combined first and second output signals applied to said medium at substantially the same level as said first output signal alone provided said input signals are substantially equal in magnitude.

7. Apparatus in accordance with claim 6 including means responsive to signals received from said transmission medium for increasing the loss in each of said paths whereby protection is afforded against retransmitting echoes caused by acoustic coupling.

8. In a conference telephone system station, in combination, a plurality of input transducers, a common voice-switched network for controlling the direction of transmission over a telephone line, a plurality of individual channal networks each connecting a respective one of said transducers to said common network, said common network including a switchguard circuit for producing an output control signal in response to signals received from siad telephone line, siad common network including means responsive to said control signal for increasing the loss in said common network in the transmit direction and each of said individual networks including means responsive to said control signal for increasing the loss in each of said individual networks.

9. Apparatus in accordance with claim 8 wherein each of said individual networks includes first and second variolosser circuits, a control amplifier, a gain adjustor circuit, a rectifier circuit and a variable gain amplifier; a conducting path from the output of said variable gain amplifier through said variolossers, said control amplifier and said rectifier; means responsive to the output of said rectifier for controlling the gain of said amplifier; and means for applying a portion of the output of said rectifier to control the loss of said first variolosser.

10. Apparatus in accordance with claim 9 wherein said variolossers include means establishing the load impedance of said first variolosser as a function of the A-C impedance of said second variolosser and means establishing the source impedance of said second variolosser as a function of the A-C impedance of said first variolosser.

11. In a conference telephone system, in combination, a plurality of microphones; a common voice-switched network including means for connecting said network to a telephone line; a plurality of channel voice-switched networks each connecting a respective one of said microphones to said common network; each of said channel networks including an amplifier having a feedback path; means for diverting a portion of the output of said amplifier as a control current; said feedback path including means responsive to a first portion of said control current for increasing the gain of said amplifier; each of said channel networks in combination with a portion of said common equipment including means for combining a second portion of said control current from each of said channel networks having a microphone input exceeding a preselected level; each of said channel networks including means responsive to the output of said combining means for increasing the transmission loss in each respective one of said channel networks; and means for substantially canceling out the effect of said last named means in active ones of said channel networks.

12. Apparatus in accordance with claim 11 wherein said common network includes means responsive to received speech signals from said telephone line for adding additional control current to the output of said combining means.

References Cited

UNITED STATES PATENTS

| | | |
|---|---|---|
| 3,236,948 | 2/1966 | De Monte. |
| 3,050,584 | 8/1962 | Miller. |
| 3,046,354 | 7/1962 | Clemency. |
| 2,267,622 | 12/1941 | Mitchell. |

KATHLEEN H. CLAFFY, *Primary Examiner.*

ROBERT P. TAYLOR, *Assistant Examiner.*

U.C. Cl. X.R.

179—81